(12) United States Patent
Hundscheidt et al.

(10) Patent No.: US 7,606,186 B2
(45) Date of Patent: Oct. 20, 2009

(54) MULTICAST IN POINT-TO-POINT PACKET-SWITCHED ORIENTED NETWORKS

(75) Inventors: Frank Hundscheidt, Kerkrade (NL); Ralf Keller, Wuerselen (DE); Thorsten Lohmar, Aachen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1034 days.

(21) Appl. No.: 10/487,379

(22) PCT Filed: Aug. 12, 2002

(86) PCT No.: PCT/EP02/09002

§ 371 (c)(1), (2), (4) Date: Jul. 29, 2004

(87) PCT Pub. No.: WO03/019861

PCT Pub. Date: Mar. 6, 2003

(65) Prior Publication Data

US 2006/0034278 A1 Feb. 16, 2006

(30) Foreign Application Priority Data

Aug. 21, 2001 (EP) .................................. 01120073

(51) Int. Cl.
*H04H 20/71* (2008.01)
(52) U.S. Cl. ...................... 370/312; 370/390; 370/432
(58) Field of Classification Search ................. 370/352, 370/390, 432, 312, 401, 408, 310.2, 328, 370/329, 335, 341–342, 395.52, 389, 338; 709/227, 236; 455/450
See application file for complete search history.

(56) References Cited

U.S. PATENT DOCUMENTS 6,519,254 B1 * 2/2003 Chuah et al. ................. 370/389

(Continued)

FOREIGN PATENT DOCUMENTS

EP 1071296 A 1/2001

(Continued)

OTHER PUBLICATIONS

Ross Finlayson (The UDP Multicast Tunneling Protocol <draft-finlayson-umtp-05.txt>) Feb. 21, 2001.*

(Continued)

*Primary Examiner*—Salman Ahmed
(74) *Attorney, Agent, or Firm*—Roger S. Burleigh

(57) ABSTRACT

The invention provides a solution for performing multicast within a telecommunication network. The basic idea is to introduce multicast transmission for parts of a network that is basically point-to-point oriented. This is done by creating transport multicast groups TLMG to transport data between network entities. The idea is to have a TLMG going to a node being close to the user. In one embodiment of the invention one TLMG is established between the SGSNs and RNCs and a second one between the GGSN and SGSNs. From the RNC the data is sent via a radio bearer to a user.

15 Claims, 6 Drawing Sheets

U.S. PATENT DOCUMENTS

Figure 1:
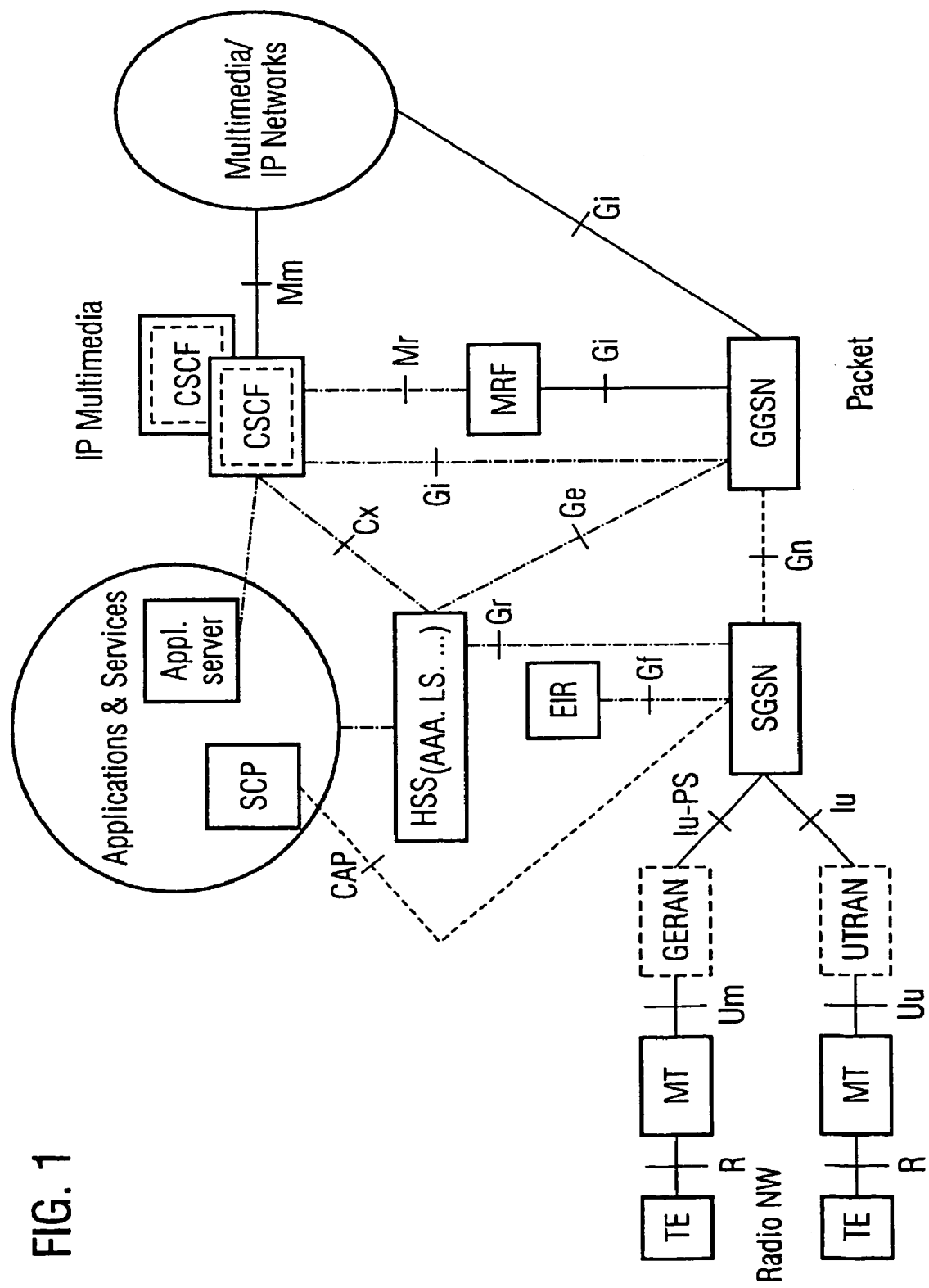

| | | | |
|---|---|---|---|
| 6,831,918 B1 * | 12/2004 | Kavak | 370/395.52 |
| 7,260,097 B2 * | 8/2007 | Casey | 370/392 |
| 7,499,466 B2 * | 3/2009 | Hundscheidt et al. | 370/432 |
| 2002/0080755 A1 * | 6/2002 | Tasman et al. | 370/338 |
| 2003/0152048 A1 * | 8/2003 | Soininen et al. | 370/328 |
| 2004/0246984 A1 * | 12/2004 | Hundscheidt et al. | 370/432 |
| 2005/0018678 A1 * | 1/2005 | Keller et al. | 370/390 |
| 2006/0034278 A1 * | 2/2006 | Hundscheidt et al. | 370/390 |
| 2006/0187950 A1 * | 8/2006 | Bou-Diab et al. | 370/432 |
| 2006/0203819 A1 * | 9/2006 | Farinacci et al. | 370/390 |

FOREIGN PATENT DOCUMENTS

| | | | |
|---|---|---|---|
| EP | 1071296 A1 * | 1/2001 | |

OTHER PUBLICATIONS

3GPP TR 25.925 (3rd Generation Partnership Project; Technical Specification Group Radio Access Network; Radio interface for broadcast/multicast services (Release 1999)).*

Performance of transport protocols over a multicasting-basedarchitecture for Internet host mobility Mysore, J.P. Bharghavan, V. Coordinated Sci. Lab., Illinois Univ., Urbana, IL ; This paper appears in: Communications, 1998. ICC 98. Conference Record. 1998 IEEE International Conference on Publication Date: Jun. 7-11, 1998.*

* cited by examiner

FIG. 3  Multicast Delivery Tree (Exemple)

←—(Replicated) Unicast—→  ←———— Multicast ————→

| Type | Length | Ptr | Route Data |

FIG. 5

Multicast table in the RNC

Option 1:

| TLMG | RAB ID | (MS ID) |
|---|---|---|
| tlmg1 | rab-id1 | (imsi-1) |
| | rab-id2 | (imsi-2) |
| tlmg2 | rab-id1 | (imsi-1) |
| | rab-id4 | (imsi-4) |
| | rab-id5 | (imsi-5) |

Option 2:

| MC-Addr | RAB ID | (MS ID) |
|---|---|---|
| mc1 | rab-id1 | (imsi-1) |
| | rab-id2 | (imsi-2) |
| mc2 | rab-id1 | (imsi-1) |
| | rab-id4 | (imsi-4) |
| | rab-id5 | (imsi-5) |

Option 3:

| GTP-ID | RAB ID | (MS ID) |
|---|---|---|
| teid1 | rab-id1 | (imsi-1) |
| | rab-id2 | (imsi-2) |
| teid2 | rab-id1 | (imsi-1) |
| | rab-id4 | (imsi-4) |
| | rab-id5 | (imsi-5) |

Option 4:

| GTP-ID | RAB ID |
|---|---|
| teid1 | mc-rab-id1 |
| teid2 | mc-rab-id2 |
| teid3 | mc-rab-id3 |

FIG. 6

SGSN Table1

| TLMG-gn | TLMG-iu |
|---------|---------|
| tlmg-gn1 | tlmg-iu1 |
|  | tlmg-iu2 |
| tlmg-gn2 | tlmg-iu1 |
|  | tlmg-iu4 |
|  | tlmg-iu5 |

Dynamic TLMGs on Gn
and Iu Interface

SGSN Table2

| TLMG-gn | MC-ID-iu | TLMG-iu |
|---------|----------|---------|
| tlmg-gn1 | mc-addr-1 | tlmg-1 |
|  | mc-addr-2 | tlmg-2 |
| tlmg-gn2 | mc-addr-1 | tlmg-1 |
|  | mc-addr-4 | tlmg-3 |
|  | mc-addr-5 | tlmg-3 |

Dynamic TLMGs on Gn and
Pre-Configured TLMGs (Alt.1) on Iu Interface

SGSN Table3

| TLMG-gn | MC-ID-iu | TLMG-iu |
|---------|----------|---------|
| tlmg-gn1 | teid1 | tlmg-1 |
|  | teid2 | tlmg-2 |
| tlmg-gn2 | teid1 | tlmg-1 |
|  | teid4 | tlmg-3 |
|  | teid5 | tlmg-3 |

Dynamic TLMGs on Gn and
Pre-Cofigured TLMGs (Alt.1) on Iu Interface

SGSN Table4

| GTP-ID | MC-ID-iu | TLMG-iu |
|--------|----------|---------|
| tlmg-gn1 | teid1 | tlmg-1 |
|  | teid2 | tlmg-2 |
| tlmg-gn2 | teid3 | tlmg-3 |
|  | teid4 | tlmg-4 |
|  | teid5 | tlmg-5 |

GTP-U Multicast on Gn (no TLMG) and
GTP-U and TLMGs on Iu Interface

MULTICAST IN POINT-TO-POINT PACKET-SWITCHED ORIENTED NETWORKS

TECHNICAL FIELD OF THE INVENTION

The present invention relates to a method, router, intermediate node, host and system for performing multicast in a telecommunication network.

Multicasting is a service that permits sources to send a single copy of the same data to an address that causes the data to be delivered to multiple recipients. Under multicasting only one copy of a message passes over any link in a network and copies of the message are made only where paths diverge. From the network perspective, multicast dramatically reduces overall bandwidth consumption, since the data is replicated in the network at appropriate points rather than in the end-systems. Further a server, which is sending multicast message needs to manage only one session.

Local area networks have supported multicasting for many years. For networks, where nodes share a common communication medium multicasting is easy to support. A specially addressed packet can be read off the communication medium by multiple hosts.

Extending multicasting capabilities to internetworks however led to the introduction of a router at the edge of a network in order to figure out dynamically how to forward the arriving data packets. The way of forwarding is for example delivered from the address included in the header of the data packet and from the routing table, which is administrated in the router. There are few possibilities of performing the multicast addressing, for example to use the address indicating the multicast group.

In case the multicast is used in Internet Protocol IP network then it is called IP multicast. Within the IP multicast the membership of a multicast session group is dynamic it means that the hosts may join and leave groups at any time. In order to allow hosts on networks to indicate whether they wish to join or leave a particular multicast group there is a protocol called the Internet Group Message Protocol IGMP. Thus this protocol lets the system know which hosts currently belong to which multicast group. This information is required by the multicast routers to know which multicast data packet is to be forwarded into which interface.

The IGMP is a part of the IP layer and the IGMP messages are transmitted in IP data packets. The version 1 of IGMP is described in RFC 1112 "Host extensions for IP multicasting" S. E. Deering, Aug. 1, 1989, RFC 2236 "Internet Group Management Protocol, Version 2" W. Fenner, November 1997 describes the version 2. The IGMP has been developed for IP version 4. In Internet Protocol IP version 6 there is a similar protocol called Multicast Listener Discovery MLD, which is used for the same purpose as the IGMP. The description of the first version of MLD is described in RFC 2710 "Multicast Listener Discovery (MLD) for IPv6" S. Deering, W. Fenner, B. Haberman, October 1999. However the messages used in MLD correspond to the IGMP messages. In the following the IGMP will be used as an example. This should not be restricted to the IGMP, the functionality of the invention is also given by usage of MLD.

The IGMP uses messages to fulfil its tasks, for example the membership report and the membership query message and the following rules are applied. The different versions of IGMP contain also additional messages.

A multicast router sends a membership query at regular intervals to see if any host still belongs to any group. The router must send one query out each interface. The group address in the query is 0 since the router expects one response from a host for every group that contains one or more members on each host. It is also possible to send a membership query for one particular group rather than for all groups. A host responds to an IGMP query by sending one IGMP report for each group that still contains at least one user. A host joins a group also by sending the membership report.

Using the information received by applying the report and the query messages a table with its interfaces having at least one host in a multicast group is established. After receiving of the multicast data, the router forwards the data out the interface, which has at least one member.

With IP multicast receivers do not need to know who or where the senders are to receive traffic from them and the senders do not need to know who the receivers are. Neither senders nor receivers need to care about the network topology as the network optimises delivery. The distribution of the information via the IP multicast is performed on the base of a hierarchical connection of the hosts, like for example a multicast delivery tree. Several algorithms have been proposed for building multicast distribution trees, like for example spanning trees, shared-trees, source-based trees, core-based trees. The descriptions of the corresponding algorithms can be found in "IP telephony: Packet-based multimedia communications systems" O. Hersent, D. Gurle, D. Petit, Addison-Wesley, Harlow, 2000. After the establishment of the multicast delivery tree, the distribution of the information is done by the IP multicast routing protocols. The detailed description of the corresponding IP multicast routing protocols can also be found in the above-mentioned document.

Multicasting in the internetworking between a fixed network and a mobile network like, General Packet Radio System GPRS or Universal Mobile Communication System UMTS causes problems. The impacts on the problems have for example the mobility of the end users and the low transmission bandwidth of the mobile network on the air interface. Further the communication in a mobile communication networks like for example in UMTS is a unicast communication. The unicast communication is also called point-to-point communication, because a message is sent from a single sender to a single receiver. In such kind of network, in particular in the core network it is not foreseen to perform a multicast communication. The group communication is implemented by means of a point-to-point communication having a sender transmitting separately packets to each of the members of the group. For a group with n members, n packets are required on the whole way between the sender and the receivers, instead of one packet when multicasting is used.

In order to explain the problem occurring in a point-to-point oriented telecommunication system in the following an overview of the architecture of the General Packet Radio System GPRS network is given.

The GPRS is the packet-switched enhancement of the Global System for Mobile Communication GSM, which is a circuit switched network. It means that the user can be permanent online connected but it has to pay only for the real data transfer. In order to fulfil the new requirements some changes are to be introduced into the GSM. Among other new logical nodes are to be introduced, the Serving GPRS Support Node (SGSN) and the Gateway GPRS Support Node (GGSN). The main functions of the GGSN involve interaction with external IP packet networks providing connections to Internet Service Providers ISPs. From the external IP network's point of view, the GGSN acts as a router for the IP addresses of all subscribers served by the GPRS networks. The GGSN also exchanges routing information with the external network. The SGSN serves all GPRS subscribers that are physically located within the geographical SGSN service area. It forwards incoming and outgoing IP packets addressed to or from a mobile station. Additional to the new logical nodes also new interfaces between the nodes are to be defined. For the invention in particular the Gn, Gi, Gp and IU-PS interfaces are relevant. The Gp interface is defined between GGSN nodes belonging to different operators. The Gn interface defines the IP based backbone between the SGSN and GGSN. The Gi is the interface between GGSN and a further network, like Internet. The restriction of GPRS is that GGSN and SGSN are to be connected in a way that IP is run on top of the technology chosen, meaning that SGSN and GGSN communicate via IP addresses. The IU-PS interface defines the communication between the SGSN and a Radio Network Controller RNC. The RNC manages Radio Access Bearers for user data, the radio network and mobility. The Radio Base Station, often called also Base Station BS or in 3GPP Node B, provides the radio resources and communicates with the user equipment over the Uu interface.

A detailed description of the architecture is to be found in 3GPP TS 03.60 V7.5.0 (2001-01) $3^{rd}$ Generation Partnership Project; Technical Specification Group Services and System Aspects, Digital cellular Telecommunications System (Phase 2+), General Packet Radio Service (GPRS), Service Description, Stage 2 (Release 1998) and 3GPP TR 25.925 $3^{rd}$ Generation Partnership Project; Technical Specification Group Radio Access Network; Radio Interface for Broadcast/Multicast Services (Release 1999), 3GPP TS 29.060 V4.1.9 (2001-06) $3^{rd}$ Generation Partnership Project; Technical Specification Group Services and System Aspects, General Packet Radio Service (GPRS), GPRS Tunnelling Protocol (GTP) (Release 4) and 3GPP TS 25.413 V4.0.0 (2001-03) $3^{rd}$ Generation Partnership Project; Technical Specification Group Radio Access Network; UTRAN Iu interface RANAP signalling (Release 4) and Internet Protocol RFC 791.

The similar nodes and interfaces are also used in the next generation of the wireless networks, in UMTS as described in 3GPP TS 23.060 V3.6.0 (2001-01) $3^{rd}$ Generation Partnership Project; Technical Specification Group Services and System Aspects, General Packet Radio Service (GPRS), Service Description, Stage 2 (Release 1999). In order to distinguish between the functionality of these nodes in UMTS extended names are often used, 3G-SGSN and 3G-GGSN. In the following description it will not be distinguished between the GPRS and UMTS nodes.

In the following an overview of an UMTS network, as specified in the 3GPP specifications, UMTS Standard 23.060 mentioned above, in respect to FIG. 1 is given.

The FIG. 1 includes the core network with a packet switching domain, deptected as Packet. The core network is connected to a radio network, depicted as Radio NW. On top of the packet switching domain of the core network, there is the IP Multimedia Subsystem (IMS), IP Multimedia for conversational multimedia services. Each of the subsystem includes the corresponding nodes. Relevant for the present invention are the nodes of the core network, the RNC, the SGSN and the GGSN node with the involved interface Gn, Gi and Iu-PS which will be further described in more detail. IMS as an example uses the packet switching domain to provide bearers for the conversational multimedia services. Streaming multimedia services are also possible without IMS by using for example a streaming server in the Internet on top of a corresponding packet switched bearer.

With the introduction of streaming and conversational multimedia services, many new point-to-multipoint services will evolve. These will have high demands on the network infrastructure and consume considerable amounts of bandwidth. Some examples of such services are video-conferencing, whiteboarding, real-time multi-user games, multimedia messaging, virtual worlds.

According to FIG. 1 an external IP network, like the Internet is depicted as Multimedia/IP Network, the mobile station as TE and the core network as Packet. Currently the IP multicast messages in the UMTS are sent from a router settled in an external IP network to the mobile station transparently through the core network via a unicast connection. Then as already mentioned the multicast is performed on the IP layer and from the view of the mobile station TE the router in the Internet is the first node in which the IP connection terminates and therefore the first node applicable for multicast. It means the IP layer in the GGSN, which allows the communication to the external networks, is currently not seen as capable for performing multicast. The router forwards multicast messages to the SGSN without distinguishing between a multicast message and a unicast messages. The separation of the multicast flows is already done in the router in the Internet and the same data packets are sent over the wireless network multiple times depending on the number of recipients.

It means the existing UMTS technology does not foresee the utilisation of efficient multicasting on the part of the network denoted by the Gn and the Iu-PS interface in the FIG. 1. Any service that is simultaneously provided to multiple clients is replicated at the edge of the wireless network and multiple unicast connections are used towards the clients. Especially with the evolution of high-demanding streaming or conversational multimedia services regarding for example to the bandwidth this implies that resources in the network are used very inefficiently.

Further the existing nodes are not prepared for performing a multicasting.

Further the existing solutions are restricted to parts of the network transmission, for example only for the part between GGSN and SGSNs. It is required to find a solution, which could be applied to the whole path in the core network this means between the edge nodes. For example in case of UMTS the edge nodes of core network are the GGSN and the base station like RNC.

In general introducing and performing of multicast in a network, that is basically point-to-point oriented causes problems, than in such kind of networks a unicast channel is established for performing a communication between two nodes. It means the problem does not only occur in a wireless network like UMTS.

Further examples of protocols being multicast capable, are SIP (Session Initiation Protocol) or RTSP (Real-time Streaming Protocol). The SIP protocol is described in Multiparty Multimedia Session Control (MMUSIC) WG in IETF, and the RTSP is covered by RFC 2326 Real Time Streaming Protocol (RTSP) H. Schulzrinne, A. Rao, R. Lanphier, April 1998. These protocols belong also to point-to-point oriented protocol stacks and the following invention applies also for them.

SUMMARY AND DESCRIPTION OF THE INVENTION

It is an object of the present invention to provide a solution for an efficient performing of the multicast transmission for multicast groups within a wireless telecommunication network. In particular it is an object of the invention to perform a replication of the multicast data packets close to end users of said network.

The invention is embodied in a method as disclosed in claim 1. Advantageous embodiments are described in the dependent claims.

The basic idea is to provide at least one transport level multicast group tunnel between a router and a host, which are the edge nodes of a wireless telecommunication network and wherein the host is located as close to the user as possible. For example in case of UMTS the router is the GGSN and the host is the RNC. However this invention does not restrict the multicast to be extended even further to the Uu interface in case of UMTS. The transport level multicast group tunnel can be either established directly between the router and the host or in case further intermediate nodes like for example the SGSNs are involved in the transmission then a further transport level multicast group tunnel or tunnels are established towards the host. One transport level multicast group tunnel can be established between the GGSN and the SGSN and a further one between the SGSN and the RNC. In this case the relation between the transport level multicast group tunnels are to be guaranteed in the intermediate node connecting said tunnels. The transport level multicast group tunnel is established by means of a signalling transport layer protocol for tunnelling. There are different possibilities depending on the interface. For example on the Gn interface the GTP-C protocol is to be used and on the Iu-PS interface the RANAP protocol. These protocols are used on one hand as means for the establishment of the transport level multicast group tunnel and on the other hand as means for providing the multicast data packets for the transmission.

According to claim 1 a user requests a multicast transmission of a multicast group. The registration is received by the router, which informs the host about the user being served by the host and registering to the multicast group. The multicast transmission between the router and the host is performed by means of at least one transport level multicast group tunnel, which is assigned to the multicast group and which is established by means of a transport layer protocol for tunnelling. The routing to the user is performed either by means of a point-to-point connection or by means of a multicast transmission with point-to-point multi radio bearer. In case of the point-to-point connection if there is more than one user being connected to a host, the host performs the replication to the multicast data packets. Anyhow the multicast data to the at least one user is routed by means of a radio bearer.

The transport level multicast group tunnel has a structure of a multicast delivery tree. By means of this structure the nodes are hierarchical connected with the router, the GGSN, as a root of the tree. The nodes are connected by means of transport level multicast group tunnels established between the nodes.

In one embodiment of the present invention the multicast transmission is performed by means of one transport level multicast group tunnel between the router and the host. It means the router is the root of the multicast delivery tree established by means of the transport level multicast group tunnel and the hosts are leafs of the tree.

In other embodiment the multicast transmission is performed by means of one transport level multicast group tunnel established between the intermediate node and the host. In this case the multicast delivery between the router and the intermediate node can be performed by means of a multicast transmission performed on a higher layer then on the transport layer as this is the case by the transport level multicast group tunnel. As an example of the multicast transmission on a higher layer serves the GTP-U protocol, in case of UMTS, with the TEID as the multicast identifier, as it is described further.

In other embodiment of the present invention at least two transport level multicast group tunnels are established between the router and the host involving at least one intermediate node. The function of the intermediate node is either to relay the information exchanged between the router and the host or the intermediate node is the root of the transport level multicast group tunnel going from the intermediate node to the host.

In order to ensure that the intermediate node is involved into the multicast transmission the multicast delivery tree is a source based multicast delivery tree.

In one possible embodiment in order to perform registration or de-registration of a user to or from a multicast group, the user informs the router. This can be done either by a direct contacting the router or by informing the intermediate node, which consequently takes care on informing the router. The router informs the intermediate nodes and/or the hosts to register or de-register to the transport level multicast group tunnel and an updating of the corresponding entries in the network is performed. This method is an embodiment of the invention and it should not be seen as a restriction for performing the registration procedure.

The invention requires a form of an identification of the multicast data packets to forward said data to the corresponding receivers. The multicast data packets are identified by means of a multicast-flow-identifier, which can be an identifier of the transport level multicast group tunnel, or an address of the multicast group to which the user is registering or a GTP Tunnelling ID TEID. The choice of the multicast-flow-identifier depends on the used method for multicast delivery, like the transport level multicast group tunnel or the multicast transmission on the higher layer.

It is preferably for the invention to provide an administration of the entries in the corresponding nodes of the network. The router administrates a relation between the identifier of the multicast group to which the user is registering and the identifier of the chosen multicast-flow-identifiers in the core network. The host administrates a relation between the multicast-flow-identifier and an identifier of the user, which can be for example the International Mobile Subscriber Identifier IMSI or the identifier of the radio bearer.

In case the intermediate node is involved in the multicast delivery then said node administrates the relation of the multicast-flow-identifier identifying the incoming multicast data from the router and the multicast data outgoing towards the hosts.

In one embodiment of the invention the transport level multicast group tunnel is a dynamic transport level multicast group tunnel. It means in case a user is the first one registering to a multicast group the transport level multicast group tunnel is established. In case the transport level multicast group tunnel is already established the registering user are attached to said tunnel.

In other embodiment of the present invention the transport level multicast group tunnel is pre-established and pre-configured and a pre-configured multicast delivery tree is created. It means the network operator takes care on the establishment of the transport level multicast group tunnel and the registering users are attached to the appropriate tunnel. The operator can consider for example different Quality of service or different geographical requirements as the parameters for the pre-configuration of the tunnel.

It is also advantageous in case of the pre-established and pre-configured transport level multicast group tunnel to provide multiplexing of the multiple multicast groups on the same pre-configured transport level multicast group tunnel.

In this case an additional administration is required in order to perform the multiplexing and the de-multiplexing in the considered nodes.

The invention discloses also a router, a host, an intermediate node and a system.

The router is adapted to perform a multicast transmission for a multicast group within a telecommunication network with said router and at least one host handling users, wherein between said router and the host at least one intermediate node is located. Said router has means for handling a user request for registration to a multicast group. This can for example includes the receiving of an IGMP message, checking the multicast address. In case there is no multicast group in the core network the router establishes a transport multicast group tunnel. This is done by means for providing a transport multicast group tunnel established by means of a transport layer protocol for tunnelling. Further the router has means for administrating a relation between the multicast group and the transport multicast group tunnel in order to sort and forward the multicast data in an appropriate way.

The intermediate node is adapted to perform a multicast transmission for a multicast group within a telecommunication network with a router and at least one host handling users, wherein between the router and the host at least one of said intermediate node is located. Said node has means for handling a user request for registration to a multicast group. The user can either registers to the intermediate node or to the router. The function of said means can be also a forwarding of this message to the router. In one embodiment of the invention a multicast delivery tree established by means of transport multicast group tunnel is built between the intermediate node and the hosts. In this case the intermediate nodes has to provide a similar functionality as the router. This is achieved by means for providing a transport multicast group tunnel established by means of a transport layer protocol for tunnelling towards the host. Further the intermediate node has means for administrating a relation between incoming and outgoing multicast data of the multicast transmission. The incoming data arrives from the router and the outgoing data is sent to the host.

The host is adapted to perform a multicast transmission for a multicast group within a telecommunication network with a router and at least one of said host handling users, wherein between the router and the host at least one intermediate node is located. The host has means for receiving multicast transmission sent either from the router or from the intermediate node. Further the host has means for administration a relation between the received multicast transmission and the user in order to forward the multicast transmission by means of radio bearer to the user. In case there is more than one user being registered to the multicast group, for which the multicast transmission is foreseen, a replication of the data is performed. The application guarantees that the replication is performed as close as possible to the user and the host is a node handling the users.

Further the invention discloses a system adapted to perform a multicast transmission for a multicast group within a telecommunication network having a router and at least one of said host handling users, wherein between the router and the host at least one intermediate node is located. The system includes at least one of the router according to claim 17, at least one of the intermediate node according to claim 18 and at least on of the host according to claim 19 wherein in the system the method according to claim 1 is performed.

In the following the transport level multicast group, which is assigned to a transport level multicast group tunnel will be called TLMG.

In the following a detailed description of the invention is given.

FIG. 1: UMTS architecture,
FIG. 2: Protocol-oriented architecture of UMTS nodes,
FIG. 3: An example of a multicast delivery tree,
FIG. 4: Syntax of the source routing based packet,
FIG. 5: Data administration in RNC,
FIG. 6: Data administration in SGSN,
FIG. 7: Registration procedure and a procedure for TLMG establishment as an embodiment of the invention.

According to the invention the basic approach is disclosed in the following FIG. 2, by applying the TLMG method on the GN and on the IU-PS interface.

Figure 2:
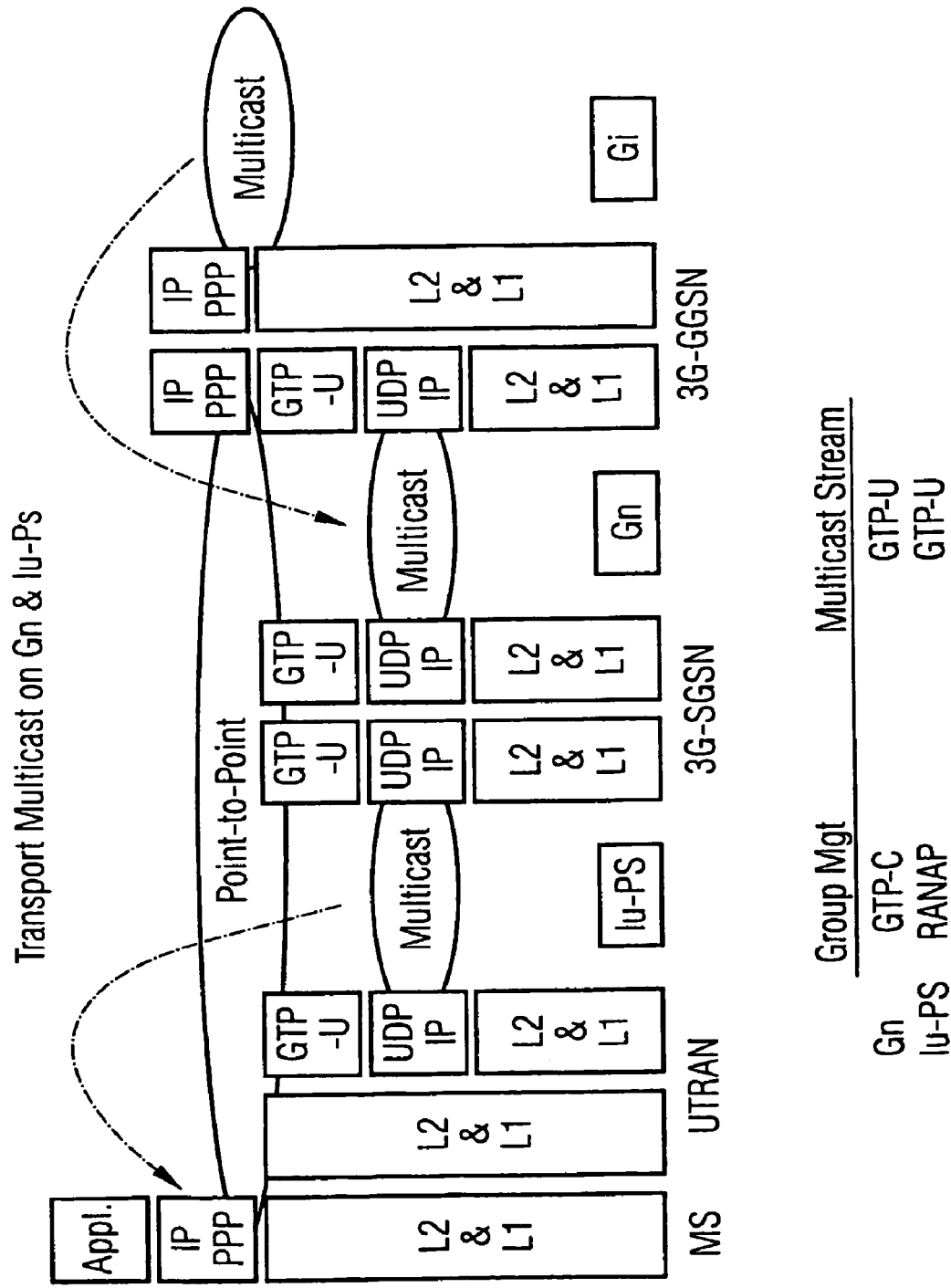

A protocol related view is reflected in the FIG. 2. The FIG. 2 shows architecture of a network as standardised in 3GPP. However this should not be seen as a restriction for the invention. The FIG. 2 shows a mobile station MS, which communicates with an access network UTRAN. The Iu-PS interface connects UTRAN with 3G-SGSN, which communicates over the Gn interface with the 3G-GGSN. The FIG. 2 provides an overview of the different protocol stacks in the different nodes. It shows a mobile station MS with an Application layer, Appl., on the top of the protocol stack, with Internet Protocol IP or with Point to Point Protocol PPP on the network layer. The lower layers are depicted as L1 and L2 layers, because they can differ in the corresponding nodes in dependence on the underlying physical network. The logical IP or PPP connection from the mobile station is terminated in the 3G-GGSN. Between the UTRAN, the 3G-SGSN and 3G-GGSN the GTP-U protocol for building a tunnel between these nodes is used. Below the GTP-U is an IP layer with UDP as a protocol for transport of the payload information.

The following description concentrates merely on the two IP layers in the packet switched domain, depicted as IP PPP and UDP IP. As the result of the function of the GGSN as a router and as an interface to the external networks the IP layer below the application layer, Appl., was introduced. Further due to the restriction of having an IP network between the GGSN and the SGSN and the RNC an IP logical connection is introduced as a transport mean, below the GTP-U layer.

Therefore in respect to the FIG. 2 there are two IP layers, in the following described as application IP and transport IP layer. The application IP layer is located directly below the application protocols in the protocol stack and connecting the mobile station and the 3G-GGSN. The second IP layer is the transport IP layer used for transmission between the SGSN, GGSN and UTRAN. The payload traffic is transported across the Gn and Iu-PS encapsulated in an application-specific tunnelling protocol, the GPRS Tunnelling protocol GTP. It is to differentiate between the GTP-C, which is an example of a transport layer protocol for tunnelling and between the GTP-U, which is a protocol for transport of user data on a higher layer then the transport layer. In GSM or GPRS the GTP protocol is only used between the SGSN and GGSN. GTP packets use UDP as transport protocol. However there are different tunnelling protocols, which are responsible for building a tunnel. The GTP is merely an example and it does not restrict the invention.

The introduction of the multicast in on the transport layer in a point-to-point oriented network is presented in respect to FIG. 2.

The idea is to introduce the multicast functionality from the application IP layer to the transport IP layer. In FIG. 2 the cloud on the Gi interface shows the multicast capability in a further network. This functionality in the core network to the transport IP layer on the Gn interface and also to the transport layer on the IU-PS interface. The arrow going from the Multicast cloud on the Gi interface to the Multicast cloud on the Gn and Iu-PS interfaces shows the redirection of the multicast performed on the application IP layer to the transport IP layer. The connection to the mobile station can remain unicast or a multicast on the radio connection can be performed. Also the logical point-to-point connection on the application IP layer is left.

On the Iu-PS and on the Gn interface different signalling protocols are used for group management. On the Iu-PS the extended RANAP protocol as described in 3GPP TS 25.413 V4.0.0 (2001-03) $3^{rd}$ Generation Partnership Project; Technical Specification Group Radio Access Network; UTRAN Iu interface RANAP signalling (Release 4), and on the Gn interface a new or an extended GTP-C is used. These protocols use different messages however the functionality remains the same. It is also possible to specify a new protocol for both interfaces.

An example of multicast delivery tree is depicted in the FIG. 3. The FIG. 3 shows spanning tree between the GGSN and the corresponding RNCs. The multicast delivery tree between the edge nodes consists of two spanning tree, one between the GGSN and the SGSNs and a second one between the SGSNs and the RNCs. It means on the whole way between the edge nodes multicast is provided. Only on the last part, it means between a host and the user on the radio interface, unicast can be applied.

In the following the enhanced functionality of the GGSN are described. This new functionality of the GGSN is required in order to perform the invention.

In order to fulfil the new tasks the GGSN has to act as a local multicast router, which is able to handle IGMP message arriving from the subscribers. The subscribers register for specific multicast groups in the GGSN and the GGSN keeps track of the active multicast groups in the packet switched network. The GGSN terminates the IGMP or MLD messages and propagates the relevant information via IGMP or MLD towards the neighbouring routers. The GGSN also handles the multicast routing protocols. So far, the GGSN acts very much like a standard local multicast router. In general a Public Land Mobile Network PLMN external local multicast router may be used instead of the GGSN itself.

Additionally, the GGSN is responsible for the creation of a multicast group in the scope of the core network, it means between the GGSN and SGSN and a major part of the radio access network, it means between the SGSN and RNCs. The GGSN then informs the corresponding SGSNs and/or RNCs that these have mobile stations registered for multicast groups.

Also the SGSN and RNC are to be enhanced by a new functionality to relay the multicast data flow from GGSN to the Iu-PS interface. It means the nodes administrate the relation between the addresses of the incoming and the outgoing multicast data. For these purpose the nodes are to have association means for mapping and forwarding the incoming multicast data to the outgoing interface. The association means can be realised by means of a table as it is described further. Further the functionality of the SGSN can be enhanced with functions needed for performing the registration of the user, in case the user registers to the SGSN and not to the GGSN by means of an IGMP message.

In the following a registration procedure of a user to a multicast group is described.

A mobile station, which wants to receive multicast messages, has to inform the corresponding GGSN about its wish. At the reception of a multicast group registration message from a mobile station, the GGSN informs the corresponding SGSNs and/or RNCs that these have mobile stations registered to multicast groups. The GGSN determines the correspondence between the multicast groups identified by a Multicast Group ID and a TLMG address. The TLMG address is included in the message sent to the SGSNs and/or to the RNCs.

In a first alternative, alternative A, the SGSN relays the TLMG registration request from the GGSN to the corresponding RNC. In the second alternative, alternative B, the SGSN registers itself to the TLMG, only for the first mobile station that registers to the multicast group, and requests the RNC to register to the TLMG. In this case the SGSN is the root of the multicast delivery tree being built between the SGSN and the RNCs by means of the established TLMGs. In the third alternative, alternative C, the SGSN is bypassed on operator request. It means the intermediate node, the SGSN, is not involved in the multicast transmission. In fact a multicast data delivery tree is created between the edge nodes in all three alternatives. This can be either a multicast delivery tree between the GGSN and the RNC or two multicast delivery trees between the GGSN and the SGSNs and the SGSN and the RNCs. Of course one RNC can have one or more subscribers for the multicast group. Preferably IP multicast is used to deliver the data to the RNC upon which the RNC replicates the packets and forwards these to the mobile stations concerned in case there are more than one user. In the further description the three alternatives are described in more details.

In the following the source based multicast routing will be described in more details.

The source-routing multicast is a mechanism to force the multicast tree establishment procedures to consider specific nodes/routers. It is a general mechanism that can be applied to other scenarios as well.

With source-routing multicast network operators can force the multicast delivery tree to include certain routers and nodes for example for charging or network management purposes that may be excluded without the use of source-routing multicast. For the Iu-PS multicast, source-routing multicast is used to force, that the SGSN is included in the multicast delivery path between the RNC and the GGSN. This forces the multicast traffic for mobile subscribers to pass the corresponding SGSN.

Source-routing is one of the IP options in both IPv4 and IPv6. Two source-routing options are defined, the Strict source routing and the Loose source routing.

The strict source routing gives the complete path from source to destination as a sequence of IP addresses. A data packet follows that exact route. The loose source routing requires the packet to traverse the list of routers specified, and in the order specified, but it is allowed to pass through other routers on the way.

Figure 4:
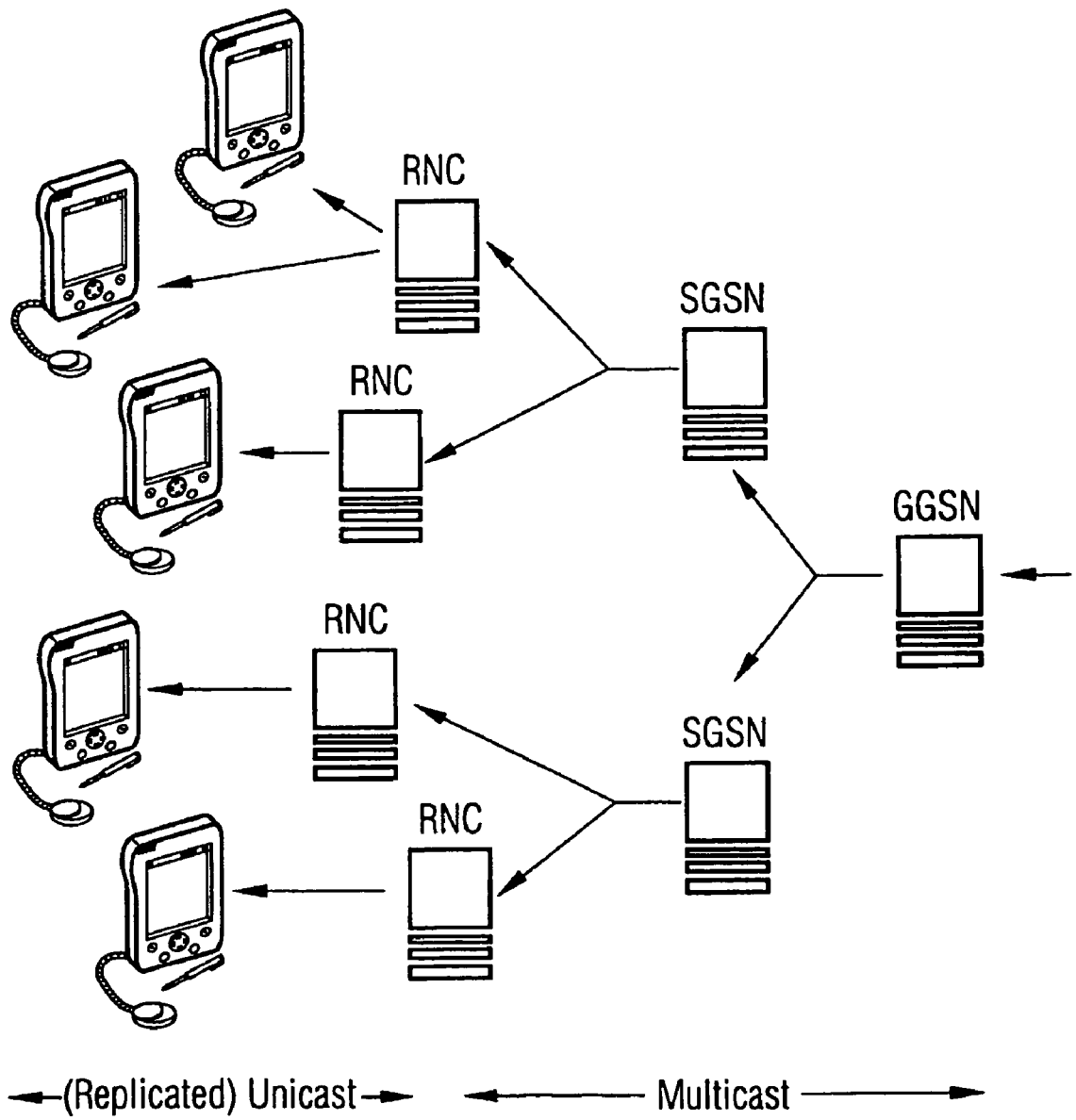

The syntax of the source-routing options is disclosed in respect to FIG. 4. Both source-routing options have the same syntax.

The Route Data contains a list of IP destination addresses through which the packet must be relayed. In the list an IP header destination field is included, which always indicates the next address to which the packet must be routed. When that destination is reached, the option is examined. The loose source and record route option provides a means for a source of a data packet to supply routing information to be used by the routers in forwarding the data packet to the destination, and to record the route information. The pointer field, Ptr, contains an index, or an octet count starting from the beginning of the option. If it is greater than the option's length, Length, the packet has reached its final destination. Otherwise, if the address in the IP destination address field has been reached and the pointer is not greater than the Length, the next destination address in the source route replaces the address in the IP destination address field, and the recorded route address replaces the source address just used, and the pointer is increased. This option is a loose source route because the router or host is allowed to use any route of any number of other intermediate routers to reach the next address in the route. In case of strict source routing, this must be the address of an adjacent router; there is no constraint in case of loose source routing. The local router's must then replace the address in the list and the pointer, Ptr, is incremented. The field Type has the information, whether it is the strict or the loose source based routing. Strict source routing is very similar to loose source routing. Instead of allowing routers or hosts to use any route of any number of intermediate routers to reach the next address in the route, these must send the data packet directly to the next address in the source route through only the directly connected network indicated in the next address to reach the next router or host specified in the route.

The loose source routing and the strict source routing can be applied in order to guarantee that a node, like a SGSN is part of a multicast delivery tree. The GGSN uses the address of the SGSN as the destination IP address and puts the address of the RNC in the source-routing options field. The SGSN then replaces the IP destination address by the RNC IP address that is contained in the source-routing options field. Optionally, the SGSN removes the source-routing options field from the IP packet header and updates other fields in the packet header accordingly.

In order to perform the alternative A the RNC reports its TLMG membership to the GGSN. This is performed only for the first registering user. In order to ensure that the SGSN is part of the tree, the membership report message must pass the SGSN on its way from the RNC to the GGSN. This can be achieved by means of configuration of the network or by having the multicast routing protocols consider loose source routing extension header when relaying the membership report messages between the multicast routers as described above. The SGSN routes the information, either the signaling information exchanged between the GGSN and the RNC or the multicast data arriving from the GGSN. The SGSN acts as a neighborhood router for the RNC with the additional processing required for the invention. Both SGSN and RNC can be requested to join the Multicast group by the GGSN. By source routing it is ensured that all packets first traverse the SGSNs.

In the alternative B the SGSN reports its TLMG membership to the GGSN and requests the RNC to report its membership to the SGSN. Logically, the SGSN can be seen as both a leaf of a TLMG and as the root of another TLMG, in case there are two TLMGs established between the GGSN and the RNCs. Therefore it is automatically ensured that the multicast traffic towards the RNC passes the SGSN.

In the alternative C the SGSN as a function in the network may be by-passed on operator's choice. In this case the GGSN is the root of the multicast tree and the RNCs are the leaves. In dependence on the implementation it may be that the multicast traffic still traverse through the SGSN, but is not further processed there. This requires a management interface through which the operator can control whether this alternative is chosen or not. This interface might be a central multicast database wherein all multicast groups are classified.

In dependence on the alternative the SGSN stores information on how to process the multicast stream coming from the GGSN. The IP multicast is used to deliver the data to the RNCs, eventually via the SGSNs upon which the RNC replicates the packets and forwards these to the users concerned or the RNC uses the multicast radio bearer to forward the data to a group of users.

In the following a preferred embodiment for a multicast delivery procedure is described.

For the multicast data delivery, the application multicast packets are addressed with a multicast identifier, which is valid within the core networks domain, the so-called multicast-flow-identifier or MC-ID. There are some alternatives for the assignment of the MC-ID. The MC-ID can be for example the TLMG address. This can be applied, when an one-to-one relation of the multicast group to which the user is registering to the TLMG in the considered point-to-point oriented telecommunication network is defined and if no additional encapsulation protocol is used, which can lead to the difficulties of packet identification. Further the MC-ID can be the actual multicast address of the multicast group, which can be the same as used in the further network and received from the IGMP message sent from the subscriber during the registration. In case the GTP-U is used to encapsulate and forward the multicast packets via the Iu-PS interface the identifier of this protocol the Tunneling Identifier TID or TEID can be used as the multicast-flow-identifier. The receiving side of the GTP-U tunnel assigns the TEID. In case of the IU-PS interface it is the RNC. The multicast delivery is performed on a higher layer as in case of TLMGs. The protocol layers are described in respect to FIG. 2. With the GTP-U tunnels as an example of a transport level multicast group tunnel, delivery tunnels are established between the nodes and on each tunnel one multicast message is transferred. In one embodiment of the invention it is foreseen to have the GTP-U tunnel for multicast transmission on the Gn interface and a TLMG multicast delivery tree on the IU-PS interface, wherein according to the standard protocol stack of course a GTP-U protocol is also available above the TLMG, it is not used for multicast transmission.

On the connection between GGSN and SGSN and also between SGSN and RNC different types of TLMGs can be used. For example a TLMG can be established on demand, the so-called dynamic TLMG. It means, when a user register to a multicast group then a dynamic TLMG is established in case the user is the first one registering to the certain multicast group. In case a TLMG for a certain multicast group to which a user wants to register, already exist then the user is only added to the corresponding TLMG.

In another solution the TLMGs are pre-established. In order to save the establishment time, the TLMGs are pre-established according to the known multicast groups and the known configuration parameters. The configuration parameter can be for example geographical regions or Quality of service requirements. A multicast flow is checked for the fulfilling of the configuration parameter. According to the result the multicast flow is assigned to the corresponding TLMG.

Because of the different alternatives to address and identify multicast flows the tables in the SGSN and RNC are to be structured in dependence on the used multicast-flow-identifier. This is disclosed in regard to FIGS. 5 and 6.

The different alternatives in dependence on the multicast flow identifier and the method for the multicast transmission on the Iu interface is described in the following in respect to FIG. 5. It is to mention that FIG. 5 discloses an embodiment of the present invention, so that the existence of the multicast flow identifier in the table is optional and implementation dependent. Further not all-possible mappings are covered by the FIG. 5.

Within each RNC, an association with the mapping for incoming multicast traffic from the Iu-PS interface having the multicast-flow-identifier to the actually used Radio Bearer or the Radio Access Bearer Context RAB-context is to be maintained. For this purpose a new multicast-group identifier, which is unique to all members of the same multicast group, or just a multicast flag is added to the RAB context. The number of the RAB context is saved in the RNC context and a RNC context is maintained per mobile terminal.

The FIG. 5 includes four alternatives depicted as option 1 to option 4. Option 1 administrates multicast flows sent by means of TLMG. In option 1 this is disclosed in the first column, depicted as TLMG, and including two TLMGs, tlmg1 and tlmg2. The tlmg1 administrates two mobile stations, which are identified by means of the International Mobile Subscriber Identifier IMSI, imsi-1 and imsi-2. This is included in the third column depicted as MS ID. However this column is optional, because every user equipment can be identified by means of the assigned radio bearer. The radio bearer identifier rab-ids are listed in the second column RAB ID. For example the second TLMG, tlmg2 relates to three radio bearers, rab-id1, rab-id4 and rab-id5.

In option 2 the possibility of multiplexing of multiple multicast session on one TLMG is shown. Two multicast groups, mc1 and mc2 are multiplexed on one TLMG. The MC-Addr is used to identify the multicast flows transmitted over one TLMG. The used TLMG can be either dynamic or pre-configured, as it is described further.

The difference between option 2 and 3 is the identifier of the multicast flow in the core network. In option 2 this is the identifier of the multicast group to which a user is registering MC-Addr. In the option 3 this is the identifier of the GTP tunnel GTP-ID, which is received during the PDP context activation.

The PDP context activation is like dialling to the external IP network. For this aim a mobile subscriber identity is associated with an IP address. During the PDP Context Activation a tunnel with an identity, in the following identified with TEID is created between the SGSN and GGSN for the PDP context. In case the GTP is used during the PDP Context Activation a GTP tunnel is established. During this procedure also a Quality of Service QoS negotiation takes place between the MS and the SGSN/GGSN.

The option 4 discloses an association, which put into relation the GTP-ID and a succeeding multicast radio bearer MC RAB ID. A multicast radio access bearer is a succeeding point-to-multipoint radio bearer. A list of mobile stations, which are covered by the Multicast Radio Bearer, may be kept separately.

Under consideration of the chosen options the RNC either replicates the received multicast packets from the Iu-PS interface in the options 1 to 3 or the data is multicast by means of the multicast radio bearer in option 4.

In the following the data administration done in the SGSN is described in respect with FIG. 6.

Within the SGSN a table similar to a routing table is maintained. The multicast flow identifier from the Gn interfaces needs to be mapped to the identifier on the Iu-PS interface. Since a SGSN can serve several RNCs the table may contain several multicast flow identifiers for the Iu-PS interface. In general the task of the SGSN is to administrate the identifier used on the Gn and on the Iu-PS interface and the relation between the identifiers. Moreover the SGSN can administrate further parameters, which depend on the chosen identifier, the alternative of the multicast delivery and the sort of the TLMG.

The FIG. 6 discloses four examples for the entries in the SGSN.

In the first table, SGSN Table 1, a tlmg-gn 1, which is the TLMG used on the Gn interface is mapped to two TLMGs on the Iu-PS interface, tlmg-iu1 and tlmg-iu2. The tlmg-IU entry refers to the transport bearer to be used. Since in some alternatives the SGSN is the root of the multicast tree for the Iu-PS interface, packet replication from the TLMG on the Gn towards several TLMG-Iu can occur. Another option is that different tlmg-IU groups exist for different multicast groups, wherein said groups have different QoS requirements. This is especially to consider in case of pre-established and pre-configured TLMGs. In the second and in the third table, SGSN table 2 and 3, additionally the multicast flow identifier for the Iu-PS interface is administrated in the MC-ID-IU column in order to distinguish between the different multicast groups. This can be for example the multicast address, mc-addr or the tunnel identifier teid as described above. The additional multicast flow identifier can be used in order to distinguish between the different QoS classes, in case such classes are defined and the pre-configuration is provided in respect to the defined classes. In the fourth table, the SGSN table 4 the case is shown, in which no TLMGs are available on the Gn interface. The multicast transmission on the Gn interface is performed on the GTP-U protocol layer. Therefore the multicast flow identifier is the teid-gn on the Gn interface. In this case there are two tunnels, teid-gn1 and teid-gn2. The teid-gn1 forwards the traffic of one multicast group. In the SGSN the traffic is replicated and forwarded on three ongoing GTP-U tunnels depicted in the second column as teid1 to teid3. On the Iu interface the multicast transmission is performed by means of the TLMGs, shown in the third column, TLMG-iu. In this embodiment, five different TLMGs are used, each configured with different QoS properties.

In case of the alternative, in which the same TLMGs are used on Gn interface and on Iu-PS interface, the TLMG-iu entry can become optional.

Figure 7:
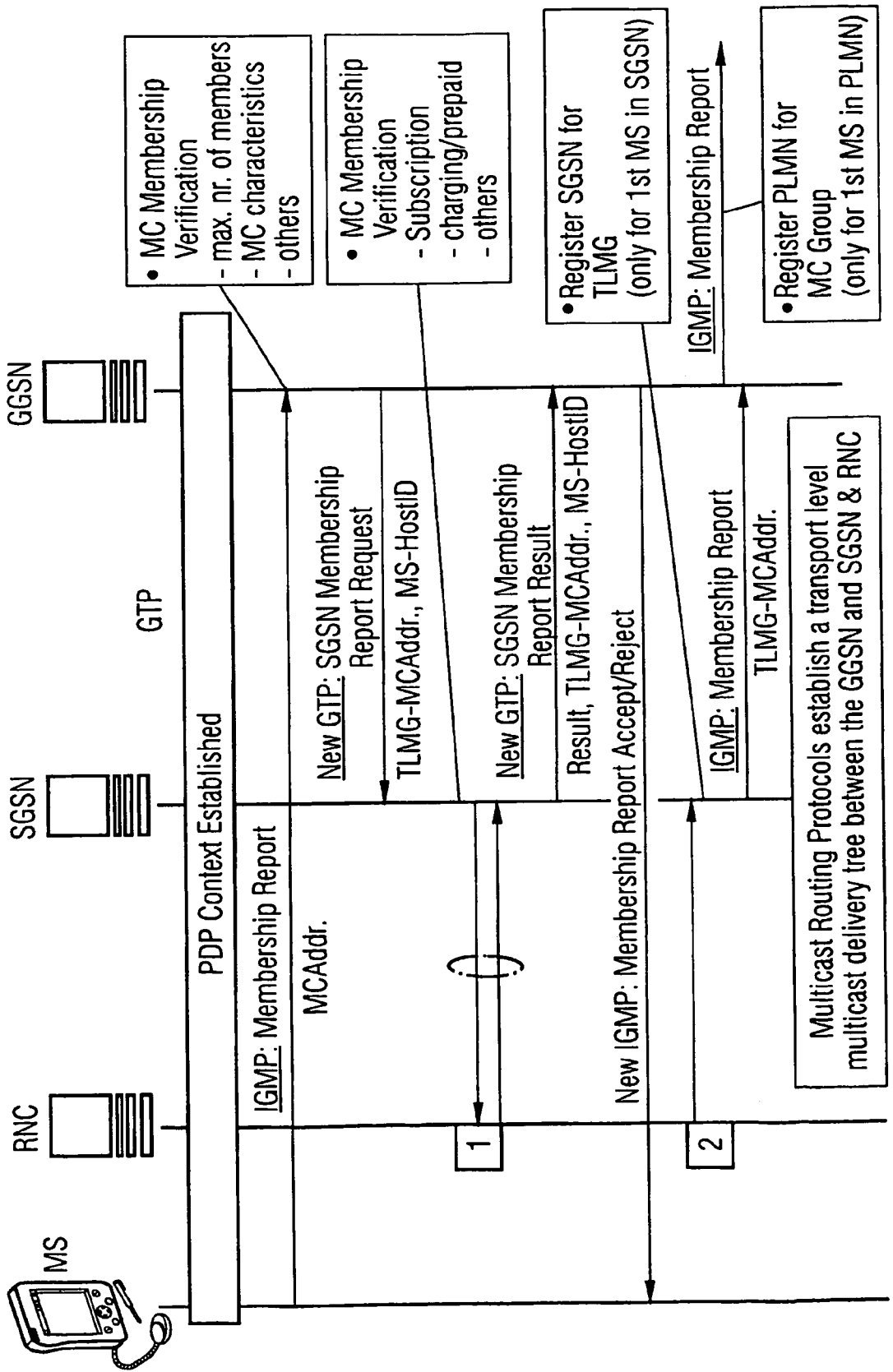

In the following an embodiment of a signaling sequence of the present invention for multicast group registration and TLMG establishment for the alternative A, B and C is described. It means one TLMG multicast delivery tree is established between the GGSN and the SGSNs and a second one between the SGSN and the RNCs. The description is based on FIG. 7. The FIG. 7 shows a time sequence of the sent messages between mobile Station MS, a SGSN and a GGSN. An arrow indicates the sent message. Above an arrow the name of the message is given and below the arrow the main parameters of the corresponding message are listed. The boxes on the right side show the action, which are performed in a node after receiving a message.

In the first step the PDP context is established as described above. In order to register to a multicast group it is the task of the mobile station MS to initiate it. Different from local multicast routers as specified in IGMP the GGSN does not send out membership queries to all mobile stations with an active PDP context. This would merely waste scarce radio resources. Instead, the mobile stations MSs initiate the joining of a multicast group by themselves. Without being requested by a membership query message, for example IGMP query message the MSs report their membership by means of a IGMP membership report message with the multicast group address, MC Addr as parameter. In this case the GGSN terminates the IGMP protocol and stores information about the multicast group membership of the MS. In the next step MC Group Membership Verification in GGSN is done in order to determine whether the mobile station is allowed to register for the multicast group. It may be for example that security checks do not allow the mobile station to join the multicast group or that the operator does not allow the multicast group registration because of the characteristics of the group or that the maximum number of allowed multicast group members has been reached. Several other checks may be performed in the GGSN.

In case the multicast group as indicated in the IGMP Membership Report does not exist in the GGSN yet, the GGSN can create a new entry for this in case of dynamic TLMG. In this case the GGSN creates a TLMG on the transport IP layer for the multicast data arriving on the application IP level. For this purpose the GGSN allocates a multicast address from the core network's address space. In the following it will be called the Multicast IP Address of the TLMG or alternative TLMG-MCAddress or simply TLMG address. In order to create the proper TLMG, the GGSN can take the negotiated Quality of Service QoS requirements from the PDP context into account. It is also possible to just provide the TLMG address to the SGSN, as described below and create the logical TLMG in the GGSN only upon reception of a positive result from the SGSN.

The GGSN informs in this case the corresponding SGSN that it has mobile stations registered for a multicast group by means of for example enhanced GTP protocol. A new GTP message, SGSN Membership Report Request can be used. It is also possible to use existing message, for example an enhanced Packet Data Unit PDU notification message on the UDP connection for this purpose. It can also be, that the SGSN is passed on the way from the mobile station to the GGSN or that the IGMP message terminates in SGSN and therefore it is not required to send this message.

For the multicast group traffic the GGSN ignores the tunnel that is already established for that MS by the SGSN during the PDP context activation and rather uses TLMGs, which form a multicast delivery tree. This kind of multicast delivery tree will be called in the further description a TLMG delivery tree.

After receiving the SGSN Membership Report Request message the SGSN makes Multicast Group MC Membership Verification. In particular it means that the SGSN can do subscription check or charging accounts check to determine whether the mobile station is allowed to register for any or for this specific multicast group.

In dependence on the chosen alternative the SGSN either relays the messages transparently between the GGSN and RNC or it terminates messages from one node and sends similar new messages to the other node. It means at reception of a IGMP Membership report message from a mobile client, the GGSN either sends an SGSN Membership Report to the SGSN as shown in FIG. 7 upon which the SGSN relays the message by for example sending a dedicated RNC Membership Report, first arrow in step 1 message with different mobile client identification parameters to the RNC or the GGSN directly sends an RNC Membership report to the corresponding RNC. The RNC Membership report is merely a fictive name for a message, which is introduced in order to guarantee a clearness of the description. This message is to be translated in an appropriate signalling protocol. For example on the Iu-PS interface this is the RANAP protocol, of which signalling message are described further.

Optionally, the GGSN includes the address of the SGSN for example the IP-address in order to be used for source routed multicast routing when establishing the multicast delivery tree. The SGSN only requests the membership reporting from the RNC when all the analyses in the SGSN have been passed successfully. Optionally, the RNC may perform some checks at reception of the membership report request from the SGSN or the GGSN, such as the availability of a multicast radio bearer, replication resources, etc. This may result in an RNC membership report result message sent back to the SGSN or GGSN.

The result of the verification done in RNC can be sent back to the SGSN or to the GGSN in a RNC Membership Report Result message, second arrow in step 2. The result of the verification done in SGSN is included in SGSN Membership Report Result message.

Furthermore, the SGSN and RNC then store the relation between the TLMG on the different interfaces, Gn, Iu-PS and radio.

Upon receipt of the SGSN Membership Report Result, the GGSN returns IGMP Membership Report Accept or Membership Report Reject, possibly containing a cause indication, depending on the outcome of the verification. This is a new message, which is not specified in IGMP. It is also feasible to send an existing error message only in case of a negative result. Otherwise, when the result of the membership report is positive, none information message is sent back.

Whenever a first MS registers to a multicast group then in dependence on the chosen alternative the SGSN itself is to register to the TLMG and is to be added to the TLMG multicast delivery tree. In this case the SGSN sends an IGMP Membership Report message to the GGSN. In case the RNC has to be added to a multicast delivery tree spanning between the SGSN and the RNC then the RNC sends an IGMP Membership Report message to the SGSN, step 2.

It means the RNC can register to the TLMG with the SGSN or with the GGSN as root. The TLMG either consists of a single multicast delivery tree between the GGSN and RNC or a TLMG is created consisting of a subtree between the RNC and SGSN it means the SGSN as root and RNC as a leaf, and a subtree between the SGSN and GGSN with the GGSN as root and RNC as leaf. Optionally, in case of two subtrees, different types of TLMGs may be used, for example the TLMG between the SGSN and GGSN is pre-configured, whereas the TLMG between the RNC and SGSN is established upon request. It is also possible to have a multicast delivery tree delivering by means of TLMGs either between the GGSN and the SGSNs or between the SGSNs and the RNCs. In this case the other part of the transmission path uses the GTP-U with the TEID for performing the multicast on the higher layer without the multicast on the transport layer. The disadvantage of this solution is that the replication of the multicast data packets is performed in the root node and not in a router located as close as possible to the receiver of the multicast data packet.

For the signaling between the SGSN and RNC the RANAP protocol as an example for performing the transmission of the RNC membership report and RNC membership report result. These messages are translated into the so-called RAB messages, which are messages for establishing the Radio Access Bearers, the so-called "RAB assignment procedures". It means the RNC membership report and the RNC membership report result are carried out by means of the messages RAB assignment request, RAB assignment response.

In order to support multicast the RANAP protocol is to be enhanced. For example the messages RAB assignment request, RAB assignment response and a release messages are to be enhanced with new parameters, like for example a flag for indicating a multicast traffic, the TLMG address or the TEID.

To setup a new Radio Access Bearer, the SGSN sends the RAB assignment request message to the RNC. The response of this message is the RAB assignment response message. Either this message is enhanced by the needed multicast parameters or a new message needs to be specified. However, the message needs to contain a traffic type indicator for multicast. This can be done either with a flag or by enhancing an existing enumerator with the multicast, for example the Traffic Class enumerator, which already includes conversational, interactive, streaming, background enumerator.

Depending on the multicast-flow identifier, which is used on the Iu-PS interface, the following mechanisms are applied by using the RANAP protocol.

In case dynamic TLMG on the Iu-PS interface are used either the SGSN or the RNC can allocate the TLMG address. If the SGSN allocates a TLMG address from the core network address space, the TLMG address as parameter is mandatory in the enhanced RAB Assignment Request message. In case the RNC allocates a TLMG address, it is part of an enhanced RAB Assignment Response message.

In both cases the RNC and the SGSN update their tables accordingly.

In case pre-configured TLMGs on the Iu-PS interface are used all RNCs join the pre-configured TLMGs. If pre-configured TLMGs are used, either the SGSN selects the TLMG with respect to the required QoS level or the RNC selects the TLMG with respect to the requested QoS level and the radio conditions. If the TLMG is selected by the SGSN, the TLMG-Address is part of the RAB Assignment Request message. If the TLMG is selected by the RNC, the selected TLMG is part of the RAB Assignment Response Message. The mapping table in the SGSN is updated accordingly.

In a preferred embodiment multicast flows are multiplexed on the TLMGs.

The TLMGs can be based on different service classes, like for example on different Quality of Service QoS parameter and optionally multiplexing of multiple multicast streams in the GGSN can be applied in the concept of pre-configured TLMGs. On each TLMG several multicast groups may be multiplexed. This means multiple multicast groups are transported on the same TLMG, as long as they have the same QoS requirements that are fulfilled by the TLMG. With this solution it is required that the multicast flows are uniquely identified. This can be achieved using additional to the TLMG address the multicast addresses, MC-Address, of the multicast groups existing in the further network.

On the Gn interface the GTP protocol is to be used in order to inform the involved entities about the relation between the entities. In case of Iu-Ps interface the RANAP can be used. For this purpose the RAB Assignment message is to be enhanced. For example in case the multicast addresses of the multicast groups MC-Address is used as multiplexing identifier then the MC-Address is passed to the RNC in the RAB Assignment Request message.

It is also possible to additional encapsulate the data packets in order to introduce a multicast address. A special protocol the Generic Routing Encapsulation GRE protocol, as described in RFC 1701 can be used to encapsulate the Multicast IP packets in order to add an additional field carrying the multicast address.

In case the GTP is used on the Iu-PS interface another multiplexing flow identifier can be used, the TEID. According to the UMTS specification, the receiving side of the GTP-U tunnel assigns the TEID. If GTP is used to encapsulate the multicast flow on the Iu-PS interface, the TEID is assigned to a multicast flow and therefore it can be used as a multiplexing flow identifier Above a procedure of TLMG establishment and registration is described. Appropriate procedure, using appropriate messages are used for de-registration procedure. For example in order to leave a multicast group the RNC sends an IGMP Leave message.

It is possible to have a scenario, in which TLMGs are used on the Gn interface and no TLMGs are established on the Iu-PS interface. In this case the TEID is used to identify the multicast flow on the Iu-PS interface. The TEID is assigned by the RNC and passed back to the SGSN in the RAB Assignment Response message. However, the RAB Assignment Request message still contains a Traffic Class Multicast parameter. Either the RNC or the SGSN can create a RAB-ID for the multicast flow. If the SGSN create the RAB-ID, it is passed over to the RNC with the enhanced RAB Assignment Request message. On reception of the enhanced RAB assignment Request message, the RNC either sends an IGMP Report message via the Iu-PS interface to the SGSN to join the multicast group. This is done only for the very first RAB assignment Request message for this multicast group. In this scenario the replication of the data packets between the registered RNCs is performed in the SGSN it means one data packet is transmitted to one registered RNC.

The invention claimed is:

1. A method for performing multicast transmission for a multicast group within a telecommunication network, wherein said network includes a core network comprising a router and at least one host in an access network part for handling users, wherein at least one intermediate node is located between the router and the host, and wherein the telecommunication network has a point-to-point layer above a transport layer, said method comprising the steps of:
   a user registers to a multicast group for the multicast transmission;
   the router receives the registration;
   the host is informed about the user being served by the host and registering to the multicast group;
   the multicast transmission between the router and the host is introduced on the transport layer and said transmission is performed by means of at least one transport level multicast group tunnel on the transport layer, wherein said tunnel is assigned to the multicast group and wherein said tunnel is established by means of a transport layer protocol for tunneling; and,
   the host uses radio bearer signaling towards the user registered to the multicast group to route the multicast data to the user;
   wherein in order to perform registration or de-registration of a user to or from a multicast group, the user informs the router directly or via the intermediate node, and the router informs the intermediate nodes and/or the hosts to register or de-register to the transport level multicast group tunnel.

2. The method according to claim 1, wherein the transport level multicast group tunnel has a structure of a multicast delivery tree.

3. The method according to claim 2, wherein the multicast delivery tree is a source based multicast delivery tree to involve the intermediate nodes into the multicast transmission.

4. The method according to claim 2, wherein the intermediate nodes administrates the relation of a multicast-flow-identifier identifying the incoming multicast data from the router and the multicast data outgoing towards the hosts involved in the multicast transmission.

5. The method according to claim 1, wherein the multicast transmission is performed by means of one transport level multicast group tunnel between the router and the host.

6. The method according to claim 1, wherein the multicast transmission is performed by means of one transport level multicast group tunnel between the intermediate node and the host.

7. The method according to claim 6, wherein the intermediate node relays information exchanged between the router and the host.

8. The method according to claim 6, wherein the intermediate node is a root of the transport level multicast group tunnel going from the intermediate node to the host.

9. The method according to claim 1, wherein at least two transport level multicast group tunnels are established between the router and the host involving at least one intermediate node.

10. The method according to claim 1, wherein multicast data packets are identified by means of a multicast-flow-identifier which corresponds to an identifier of the transport level multicast group tunnel, or to an address of the multicast group to which the user is registering or to a GTP tunneling ID TEID.

11. The method according to claim 1, wherein the router administrates a relation between multicast groups and multicast-flow-identifiers in the core network, and the host administrates a relation between multicast-flow-identifier and an identifier of the user or group of users.

12. The method according to claim 11, wherein the identifier of the user is an International Mobile Subscriber Identifier (IMSI) or an identifier of the radio bearer.

13. The method according to claim 1, wherein the transport level multicast group tunnel is a dynamic transport level multicast group tunnel in case for a user being the first one registering to a multicast group the transport level multicast group tunnel is to be established.

14. The method according to claim 1, wherein the transport level multicast group tunnel is pre-established and pre-configured and a pre-configured multicast delivery tree is created.

15. The method according to claim 14, wherein multiple multicast groups are multiplexed on the one pre-configured transport level multicast group tunnel in case the pre-configuration corresponds to the requirements of the multiple multicast groups.

* * * * *

UNITED STATES PATENT AND TRADEMARK OFFICE
CERTIFICATE OF CORRECTION

PATENT NO. : 7,606,186 B2 Page 1 of 1
APPLICATION NO. : 10/487379
DATED : October 20, 2009
INVENTOR(S) : Hundscheidt et al.

It is certified that error appears in the above-identified patent and that said Letters Patent is hereby corrected as shown below:

In Column 3, Line 50, delete "depticted" and insert -- depicted --, therefor.

In Column 17, Line 62, delete "identifier" and insert -- identifier. --, therefor.

Signed and Sealed this

Eighteenth Day of May, 2010

David J. Kappos
*Director of the United States Patent and Trademark Office*